June 26, 1962   R. BOYER, SR   3,041,115
CUP-SHAPED ARTICLE
Filed Feb. 16, 1959
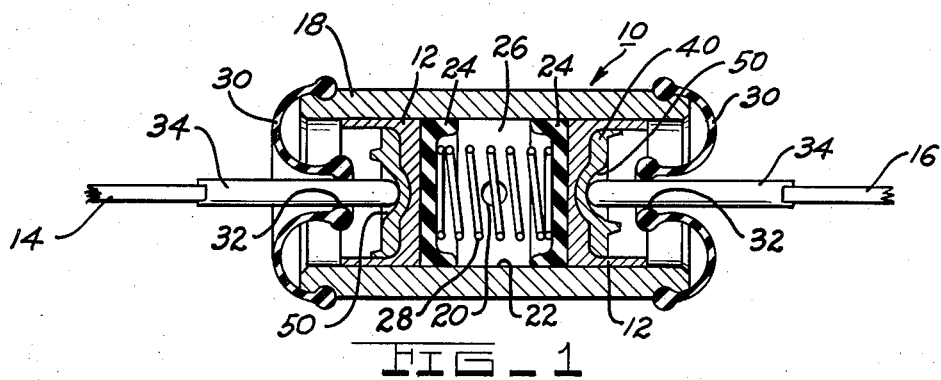
FIG_1
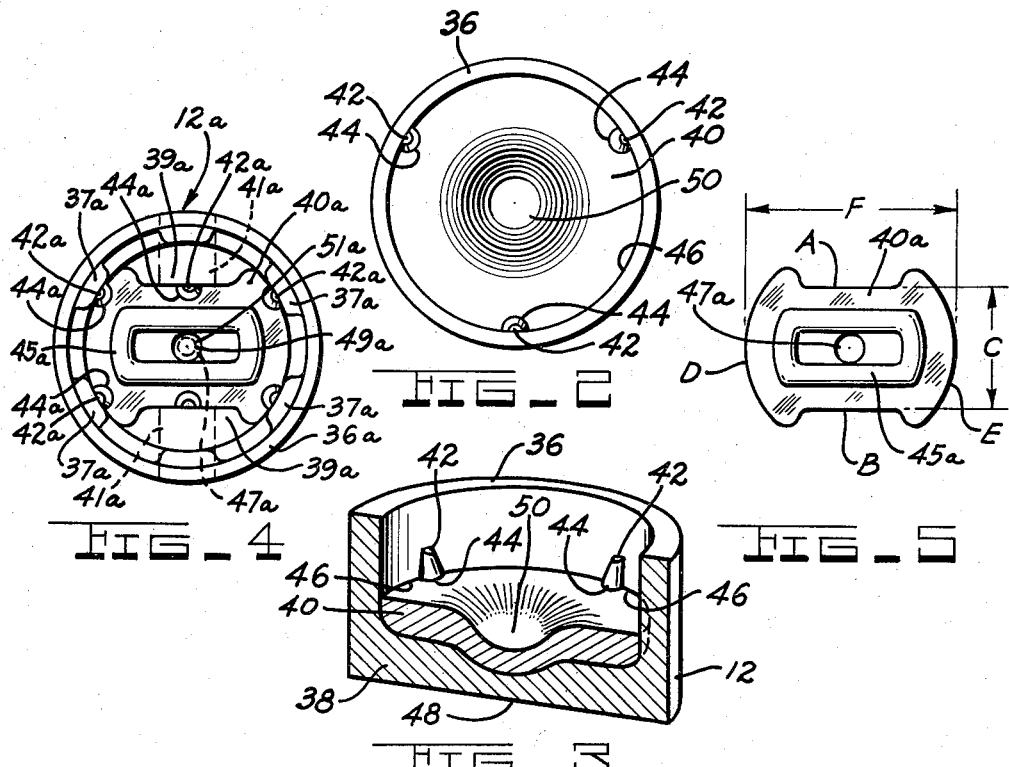
FIG_2
FIG_4
FIG_5
FIG_3
INVENTOR.
RAYMOND BOYER SR.
BY *Cecil F Arens*
ATTORNEY.

United States Patent Office 3,041,115
Patented June 26, 1962

3,041,115
CUP-SHAPED ARTICLE
Raymond Boyer, Sr., South Bend, Ind., assignor to The Bendix Corporation, a corporation of Delaware
Filed Feb. 16, 1959, Ser. No. 793,398
6 Claims. (Cl. 309—4)

The present invention relates to an article made from two different metals.

This invention is an improvement on the inventions disclosed in application Serial No. 699,665, filed November 29, 1957, and application Serial No. 723,049, filed March 21, 1958, the former of which is licensed and the latter of which is assigned to the Bendix Aviation Corporation.

The piston of the invention which is constructed from a steel insert and an aluminum shell has these attributes: (1) increased strength, (2) requires less aluminum, (3) improved wear surface, (4) allows greater unit pressure on face of piston, and (5) cheaper to manufacture.

Various schemes have been employed in the art to combine a steel insert with a cup-shaped article, such as a piston. None of these schemes investigated have all the advantages offered by the cup-shaped article of this invention.

One of the principal objects of the present invention is to provide a cup-shaped article having a reinforced bottom made from metal having a different hardness than the metal forming the side wall of said article.

Another object of the invention is to provide a cup-shaped article having a steel insert secured in the bottom thereof by deformed portions of the side wall of said article.

Still another object of the invention is to provide an aluminum cup-shaped piston having a steel disclike insert attached at the closed end of the piston by nibs integrally related to the piston wall.

A still further object of the invention is to provide a cup-shaped article, such as a brake wheel cylinder piston, made from an aluminum body and a steel disc-shaped insert in which the steel insert is locked in the closed end of the piston by portions of the aluminum body engaging the periphery of said insert at spaced apart intervals.

A yet further object of the invention is to provide an aluminum cup-shaped brake wheel cylinder piston having a steel disc-shaped insert located at the bottom to establish a hardened surface against which an operating link pushes for transmitting an actuating force to brake members, said disc-shaped insert being fastened to the bottom of said piston by nibs or projections integrally formed with the piston wall.

Other objects and advantages of my invention will be apparent from the following description wherein reference is made to the accompanying drawings:

FIGURE 1 is a view in section of a brake wheel cylinder showing the operating relationship of the brake shoes to the pistons FIGURE 2 is an enlarged view of the piston of FIGURE 1;

FIGURE 3 is a perspective view of the piston of FIGURE 2 with a fragment of the side wall removed;

FIGURE 4 is a bottom view of a piston used in an engine; and

FIGURE 5 is a view of the insert used in the piston of FIGURE 4.

Referring now to the drawings, numeral 10 designates generally a brake wheel cylinder provided with oppositely acting pistons 12 for actuating shoes 14 and 16 of a brake assembly, not completely shown. The wheel cylinder 10 comprises a cast housing 18 having an inlet 20 connected to a source of fluid pressure, not shown. The pistons 12 are arranged for reciprocal motion in a bore 22 of the housing 18. Sealing cups 24 are carried at the inner ends of the pistons to prevent the escape of hydraulic fluid from chamber 26 which communicates with the inlet 20. The sealing cups 24 are held against the inner ends of the pistons by a precompressed spring 28 interposed between the cups. Rubber boots 30 are provided at each end of the wheel cylinder housing 18 to exclude foreign matter from the bore 22. The rubber boots 30 are formed with a central opening 32 to receive thrust links 34. These thrust links are interposed between the pistons 12 and the brake shoes 14 and 16 for transmitting an actuating force to the brake shoes as a result of pressurization of the fluid in the chamber 26.

The piston 12 of the invention is manufactured from an aluminum body constructed with a shell-like side wall 36 having a closed end or bottom 38. A disc-shaped member or steel insert 40 is located adjacent the bottom 38 of the cylindrical shell-like wall to reinforce the bottom end of the piston and also provide a wear surface for the force transmitting rod or thrust link 34. The diameter of the steel insert 40 is substantially the same as or preferably slightly less than that of the inner diameter of the shell-like wall 36, as best shown in FIGURE 3. Nibs or projections 42 are formed integrally with the shell-like wall in such a manner as to have portions 44 of these nibs overlying the peripheral edge 46 of the steel insert 40.

This relationship between the diameters of the steel insert and the inner shell-like wall minimizes the amount of overlap of the wall on the peripheral edge of the insert; the intent being to support the insert entirely on the portions 44 of the nibs. This construction permits a reduction in the over-all amount of aluminum required for a given size piston. Maintaining this relationship of diameters also insures uniformity in thickness of the shell-like wall and avoids the formation of thin wall sections in the vicinity of the periphery of said insert. That is, should the diameter of the insert 40 be greater than the inner diameter of said shell-like wall the peripheral edge of said insert will extend into the wall section 36, thus weakening the wall in that area.

Any number of nibs or projections may be used to support the steel insert. A force applied to face 48 of the piston will be transmitted to the steel insert 40 which is carried on these nibs or projections 42. The use of a steel insert in the closed end of the piston permits the application of greater unit pressures on the face of the piston than would be possible if the steel insert were replaced by an equal volume of aluminum. It has been found that the use of nibs or projections as herein disclosed accounts for a substantial reduction in the amount of aluminum used as compared to a situation wherein the steel insert is locked into position by a ring of aluminum encompassing the entire peripheral edge of the insert.

The disc-shaped member 40 used to reinforce the bottom of the piston is made from a metal harder than the body member and is provided with a central depression 50 for receiving one end of the thrust link 34. The steel insert not only provides a reinforced bottom section but furnishes a wear surface not normally produced in aluminum. Although aluminum and steel are mentioned as the materials used herein it should be understood that other materials suitable to a particular environment may be employed without departing from the spirit of the invention.

Numeral 12a of FIGURE 4 represents another type of piston constructed according to my invention. This particular type of piston is used in engines and comprises a side wall 36a formed with a plurality of reinforcing ribs 37a and two bosses 39a. The bosses 39a are drilled at 41a to receive wrist pins, not shown. A disclike steel insert 40a is located in the bottom of the piston 12a to reinforce the bottom against pressures applied to the face of the piston. The disclike insert 40a differs in shape and design from the one of FIGURE 3 in order to conform to the configuration of the internal construction of the piston 12a. That is, the general outline of the peripheral edge of the insert 40a is such as to conform to the inner configuration of the hollow cylindrical shell. The insert is provided with parallel edges A and B having a dimension C, which is substantially equal to the distance between the inner faces of the bosses 39a. The curved portions D and E of the insert have a dimension F, which is substantially equal to the inner diameter of the cylindrical shell measured in the direction of the dimension F with the insert in position in the piston.

The disclike insert 40a is supported in the bottom of the piston 12a by a plurality of nibs 42a. These nibs are suitably spaced around the peripheral edge of the insert with portions 44a of the nibs overlying the insert to securely lock it against the bottom of the piston. A rib 45a adds rigidity to the insert 40a.

The insert 40a is provided with additional fastening and supporting means in the form of an opening 47a adapted to receive a protrusion 49a carried on the inner side of the bottom of the piston. With the insert properly located in the piston the protrusion is reformed so that portions 51a overlie the edge of the hole 47a. The protrusion 49a also performs the function of accumulating oil at a particular location to be dropped on the moving parts beneath the piston.

In my description of the steel insert I have referred to a disc-shaped or disclike member or steel insert in order to describe in a general sort of way the geometry of the insert but it is not my intention to restrict the shape or size of the insert. Actually the size and shape of the insert is determined largely by the design of the piston.

It will be understood that although the principles of my invention have been depicted in connection with a brake wheel cylinder piston, this representation is by illustration only; the principles are equally applicable to other forms of bimetallic articles.

I claim:

1. A piston for use in a wheel cylinder on a brake, said piston comprising an aluminum body member having a hollow cylindrical wall of substantially uniform wall thickness and a bottom to which said wall is integrally joined, a disk-like hard steel insert provided with a central depression for receiving a brake force transmitting link, said insert having a diameter which is proportioned to be less than the inner diameter of said wall and located adjacent said bottom for reinforcing the bottom against external forces acting on the opposite faces of said bottom, and a plurality of projections constructed integrally with the inner hollow cylindrical wall and projecting inwardly to overlie the peripheral edge of said insert and forming a retaining lock for holding said insert against the bottom of said piston.

2. A piston comprising a body member constructed with a cylindrical shell-like sidewall having a closed end, a disk-shaped insert proportioned with a diameter substantially that of the inner diameter of said shell-like sidewall, locking means for retaining said insert against the inner face of the closed end of the piston, said locking means including nibs integrally related to said sidewall and projecting inwardly to overlie said insert at circumferentially spaced locations on said sidewall.

3. A piston for use in a wheel cylinder on a brake, said piston comprising a body member having a cylindrical shell-like wall and a transverse end closure, a disk-shaped insert including a central depression therein to receive a brake operating part and proportioned with a diameter substantially equal to the inner diameter of said shell-like wall and a plurality of nibs formed integrally with the inner surface of said shell-like wall and having portions engaging said insert to effect a lock which maintains the insert in seated relation with the end closure at its inner surface.

4. A piston comprising a body member including a cylindrical shell-like wall and a transverse closure at one end of said shell-like wall, a disk-shaped insert proportioned with a diameter substantially equal to the inner diameter of said wall, said insert being formed from a material having greater strength and rigidity than that of said body member, and a plurality of nibs spaced circumferentially about the inner surface of said shell-like wall and integral therewith and located in offset relation with the inner surface of said end closure to effect a clamping engagement with said insert maintaining the insert in seated position against the inner surface of said end closure.

5. A piston comprising a body member having a hollow cylindrical wall and a bottom attached to one end of said cylindrical wall with a central recess therein, a disk-like member having a protrusion fitted within a recess in said bottom, and a peripheral edge which conforms substantially with the inner diameter of said wall, said disk like member being of a harder metal than said body member, and a plurality of nibs integral with said wall and disposed at circumferentially spaced points along the inner surface of said hollow cylindrical wall and overlying the peripheral edge of said disk-like member to retain it in seated relation against the bottom of said body member.

6. A reinforced cup-shaped article, comprising walls forming a hollow member, a member joined to and closing one end of said first mentioned member, an insert in contact with the inner surface of said second mentioned member, and a plurality of spaced lugs integrally attached to the internal side walls and contacting said insert on the side opposite said second mentioned member.

References Cited in the file of this patent

UNITED STATES PATENTS

| | | |
|---|---|---|
| 1,735,206 | Madden | Nov. 12, 1929 |
| 1,786,856 | Madden | Dec. 30, 1930 |
| 2,127,741 | La Brie | Aug. 23, 1938 |
| 2,246,242 | Chase | June 17, 1941 |
| 2,629,463 | Freeman | Feb. 24, 1953 |
| 2,867,297 | White | Jan. 6, 1959 |